(12) United States Patent
Ghosh et al.

(10) Patent No.: US 10,070,449 B2
(45) Date of Patent: *Sep. 4, 2018

(54) MULTI-PHASE WIRELESS SOUNDING (71) Applicant: Intel Corporation, Santa Clara, CA (US)

(72) Inventors: Chittabrata Ghosh, Fremont, CA (US); Yaron Alpert, Hod Hasharoni (IL); Avi Mansour, Haifa (IL); Ziv Avital, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,383

(22) Filed: Aug. 28, 2017

(65) Prior Publication Data

US 2018/0042029 A1 Feb. 8, 2018

Related U.S. Application Data

(63) Continuation of application No. 14/866,283, filed on Sep. 25, 2015, now Pat. No. 9,750,038.

(60) Provisional application No. 62/184,931, filed on Jun. 26, 2015.

(51) Int. Cl.
| | |
|---|---|
| *H04W 72/08* | (2009.01) |
| *H04B 17/00* | (2015.01) |
| *H04L 25/02* | (2006.01) |
| *H04W 24/10* | (2009.01) |
| *H04L 5/00* | (2006.01) |

(52) U.S. Cl.
CPC .......... *H04W 72/082* (2013.01); *H04B 17/00* (2013.01); *H04L 25/0224* (2013.01); *H04W 24/10* (2013.01); *H04L 5/0048* (2013.01)

(58) Field of Classification Search
CPC ................ H04W 72/082; H04W 24/10; H04L 25/0024; H04L 5/0048; H04B 17/00
See application file for complete search history.

(56) References Cited

U.S. PATENT DOCUMENTS

| | | | |
|---|---|---|---|
| 9,750,038 B2* | 8/2017 | Ghosh | .................. H04W 24/10 |
| 2006/0146750 A1 | 7/2006 | Chen et al. | |
| 2012/0250618 A1 | 10/2012 | Abraham et al. | |

(Continued)

OTHER PUBLICATIONS

"U.S. Appl. No. 14/866,283, Non Final Office Action dated Dec. 9, 2016", 16 pgs.

(Continued)

*Primary Examiner* — Mohammad S Anwar
(74) *Attorney, Agent, or Firm* — Schwegman Lundberg & Woessner, P.A.

(57) ABSTRACT

System and techniques for multi-phase wireless sounding are described herein. A first set of stations may be selected by an access point from a plurality of stations known to the access point. The access point may then transmit a first sounding request to members of the first set of stations. The access point may receive a sounding report in response to the first sounding request from members of the first set of stations. The access point may then select a second set of stations from the plurality of stations based on the sounding report. This second set of stations is a proper subset of the first set of stations. The access point may then transmit a second sounding request to the second set of stations.

20 Claims, 5 Drawing Sheets

(56) References Cited

U.S. PATENT DOCUMENTS

| | | |
|---|---|---|
| 2015/0155993 A1 | 6/2015 | Berggren et al. |
| 2016/0143006 A1 | 5/2016 | Ghosh et al. |
| 2016/0143026 A1 | 5/2016 | Seok |
| 2016/0380730 A1 | 12/2016 | Ghosh et al. |

OTHER PUBLICATIONS

"U.S. Appl. No. 14/866,283, Notice of Allowance dated Apr. 25, 2017", 6 pgs.
"U.S. Appl. No. 14/866,283, Response filed Apr. 10, 2017 to Non Final Office Acton dated Dec. 9, 2016", 12 pgs.

\* cited by examiner

MULTI-PHASE WIRELESS SOUNDING

CLAIM OF PRIORITY

This patent application is a continuation of U.S. application Ser. No. 14/866,283, filed Sep. 25, 2015, which claims the benefit of priority, under 35 U.S.C. § 119, to U.S. Provisional Application Ser. No. 62/184,931, titled "WIRELESS DEVICE, METHOD, AND COMPUTER READABLE MEDIA FOR A TWO-PHASED METHOD OF CHANNEL SOUNDING IN WIRELESS LOCAL-AREA NETWORK" and filed on Jun. 26, 2015, the entirety of which are hereby incorporated by reference herein.

TECHNICAL FIELD

Embodiments described herein generally relate to wireless communications and more specifically to multi-phase wireless sounding.

BACKGROUND

Wireless multi-user transmission technologies (e.g., orthogonal frequency-division multiple access (OFDMA), multi-input multi-output (MIMO), etc.) have steadily increased in the past several years and have been incorporated in a number of standards such as the IEEE 802.11ax high efficiency wireless (HEW) family of standards. These multi-user transmission technologies often sub-divide a wireless transmission element (e.g., division of channels into sub-channels in the case of OFDMA) in order to increase wireless efficiency to participating devices, generally permitting increased throughput and higher device densities.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

To compensate for the time varying, frequency selective nature of the wireless local area network (WLAN) propagation effects, and generally to enhance effective encoding and modulation in a wireless communication system, each receiver of the wireless communication system may periodically develop or collect Channel Sounding Information (CSI) for each of the frequency sub-channels, such as the sub-channels associated with each of the OFDM sub-bands, or spatial streams associated with MIMO operation. The IEEE 802.11 family of standards uses a channel sounding protocol to obtain the required CSI used for effective multi-user beamforming transmission. Such sounding measurements may be transmitted to a serving AP and used to precondition the signals, transmitted using that channel so as to compensate for the varying propagation effects of each of the channels.

One issue with multi-user transmission (MU-MIMO, OFDMA, etc.) performance arises in optimizing beam width (BW) (e.g., spatial allocation), resource unit (RU) (e.g., sub-channel frequency allocation), or inter-user interference avoidance for stations (STAB). Selecting good BW or RU configurations for any given STA wile mitigating inter-user interference is a difficult problem often entailing frequent transmitter (e.g., STA) sounding measurements of sounding elements (e.g., spatial streams or sub-channels) to maintain up-to-date measurements needed to effectively use multi-user transmission techniques. Complementing the multi-phase reporting discussed above, different feedback types may he used to implement a sparse sounding report, where only the necessary information is included in the report. Such sparse sounding reports may be specific to particular sounding elements, such as those relating to MU-MIMO or OFDMA. Additionally, the nature of the sounding report may be specified to the STAs by the AP via a number of frames, including, for example, a null data packet (NDP) frame. All of these techniques are interoperable to reduce unnecessary reporting by the STAs without sacrificing wireless performance.

The increased sounding measurements can be costly to HEW devices in terms of power consumption and processing resources. To address this problem, both the nature of sounding reporting and the frequency of such reporting may he varied such that STAs need only report what they need to and avoid unnecessary processing. For example, the sounding reports may be requested in a multi-phase processing whereby a set of STAs are selected to report in a first phase and a subset of the set of STAs are selected to report in a second, or other subsequent phase. The subsequent phase reporting may limit such reports to abbreviated updates of specific sound elements, sounding metrics, etc. to avoid requesting redundant and resource wasting reports. In this manner, the power conscious objectives of the HEW devices may he met without sacrificing multi-user wireless performance.

Figure 1:
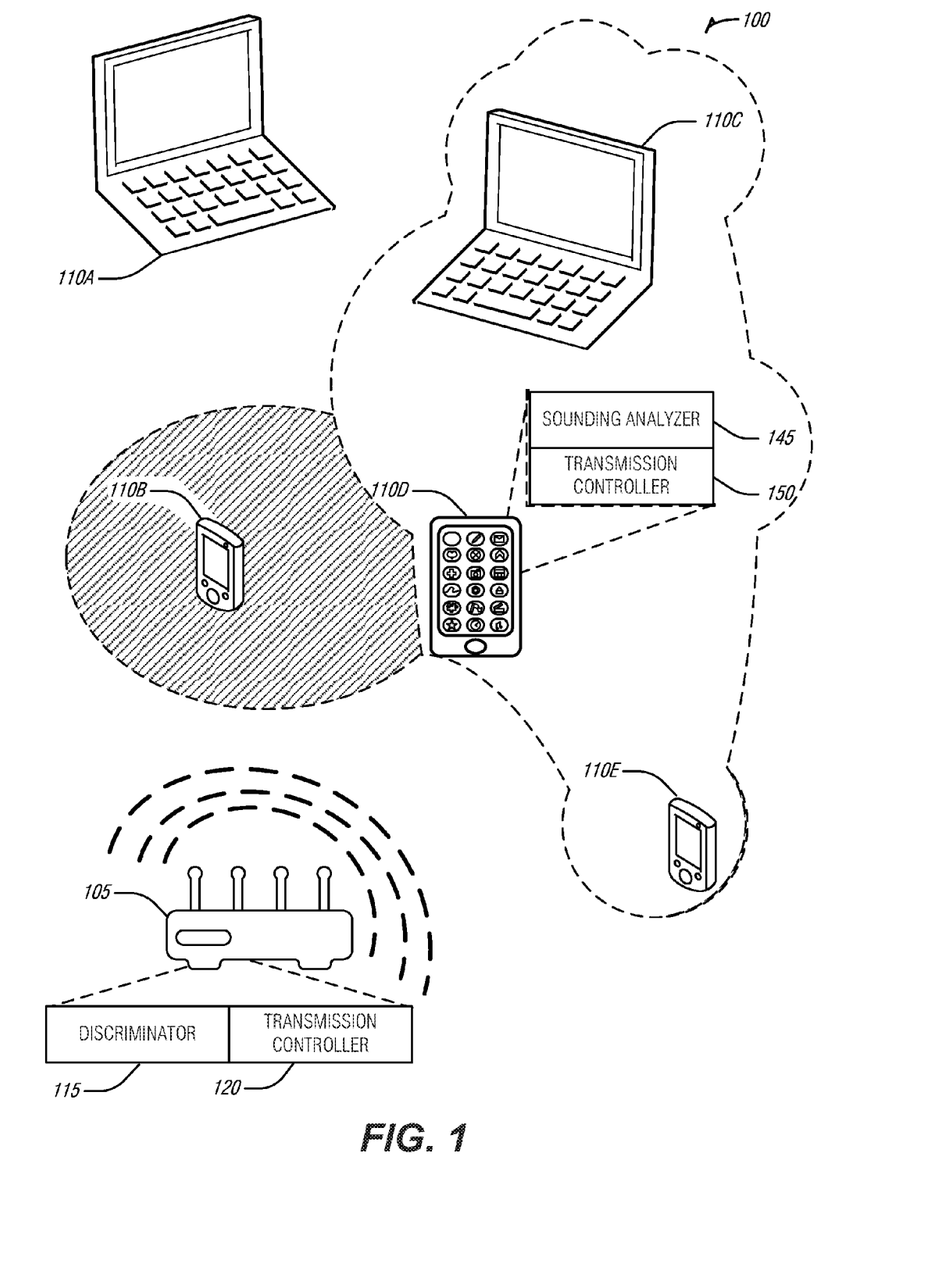
FIG. 1 illustrates an example of an environment for multi-phase wireless sounding, according to some embodiments.

FIG. 1 illustrates an example of an environment 100 for multi-phase wireless sounding, according to some embodiments. As illustrated, the environment 100 includes a numbers of STAs 110A-E (a non-specific STA referenced herein as 110) and an AP 105. In an example, the STA 110 and the AP 105 operate according to an IEEE 802.11ax family of standards. As described below with respect to FIG. 1, the exchanges or the multi-phase wireless sounding are presented from the AP 105 side and from the STA 110 side separately. An example of an integrated message flow is described below with respect to FIG. 2. Further, although the AP 105 is described as the requester and the STA 110 is described as the receiver, similar operations may be implemented between STAs 110 in, for example, a peer-to-peer arrangement.

The AP 105 may include a discriminator (e.g., filter or selector) 115 and a transmission controller 120. In an example, the discriminator 115 and the transmission controller 120 are implemented as a component of the AP 105. In every case, the discriminator 115 and the transmission controller 120 are implemented in computer hardware, such as a circuit set described below with respect to FIG. 5.

The discriminator 115 may be arranged to select a first set of STAs from a plurality of STAs known to the AP 105. As illustrated, the STAs 110A-E are those known to the AP 105. STAs within the dashed line are in the first set of STAs (e.g., STAs 110B-E). In an example, to select the first set of STAs, the discriminator 115 may be arranged to classify the plurality of STAs 110 known to the AP 105 by several factors. The classification may include a numerical or other comparable value applied to given STAs for one or more of the factors. When the classification (e.g., factor values) of a STA 110 meets a threshold —e.g., is below a low threshold when a higher value is wanted, is above a threshold when a lower value is wanted, etc. —that STA 110 is included in the first set of STAs. Example factors that may be used include STA capability, measured STA transmission characteristics (e.g., based on previous transmissions), expected allocation of wireless elements (e.g., beam width, resource units, etc.), expected total or allocated transmit power, or expected beamforming format (e.g., for specific STAs 110 or a group of STAs 110). In an example, the discriminator 115 may be arranged to select STAs for the second set of STAs based on not being represented in the sounding report. For example, if STA 110C did not respond to the first sounding request, STA 110C is included in the second set of STAs. In this way, the sparse reporting mechanism is applied to the other STAs 110D-E, while retransmission is requested. for STA 110C.

The discriminator 115 may be arranged to select a second set of STAs from the plurality of STAs based on a received sounding report. As illustrated, the STAs in the unshaded region within the dashed line are the second set of STAs (e.g., STAs 110C-E). The second set of STAs is a proper subset of the first set of STAs. As described above, the discriminator 115 may be arranged to classify STAs 110 in order to select STAs 110 for inclusion in the second set of STAs. The difference here, is in factor selection. That is, to implement sparse reporting, the second set of STAs (e.g., the second phase) will result in clarification or update requests of data in the sounding report. Accordingly, factors that may be considered in selecting the second set of STAs may include, a STA's beamforming report of spatial channel sounding information (SCSI) key performance indices (KPIs), AP 105 quality of service (QoS) KPIs, STA's operational mode (e.g., low power, power save, etc.), STA's long term link level KPIs (e.g., power, SNR, estimated SNR (ESNR), signal-to interference-plus-noise ratio (SINR), link budget, noise floor, number of STAs receive antennas, channel status information feedback, goodput, channel occupancy, etc.), or STA-AP mutual interference level KPIs (e.g., power, SNR, ESNR, SINR, link budget, number of STA receive antennas, CSI, computing a preceding matrix, etc.). As noted above, these factors are considered in selecting the second set of STAs. Further, classification of these factors informs the report type indications that will be transmitted in the second sounding request.

The transmission controller 120 is arranged to transmit a first sounding request to members of the first set of STAs. This transmission may either he direct (e.g., the transmission controller 120 controls the transmitter of the AP 105) or indirect (e.g., the transmission controller 120 interfaces with the transmission mechanism of the AP 105 to effectuate transmission).

The transmission controller 120 is arranged to receive the sounding report sent from members of the first set of STAs in response to the first sounding request. It is here assumed that the sounding report includes responses from a non-empty subset of the first set of STAs. In an example, the transmission controller 120 is arranged to transmit a multi-user block acknowledgment (M-BA) in response to receiving the sounding report. The M-BA includes those STAB 110 for whom further reporting in this multi-phase iteration is complete, thus signaling that the identified STAs 110 may enter a non-communicative (e.g., power save or low power) mode of operation.

The transmission controller 120 is arranged to transmit a second sounding request to the second set of STAs. In an example, the first or the second sounding request may be transmitted in a number of different wireless frames. In an example, the wireless frames include one or more of a trigger frame for sounding (TFS), NDP-A frame, or a HE-NDP frame.

In an example, the first or the second sounding report include an indication of a report type pertaining to sound element measurements. Sound element measurements are those wireless measurements that may be taken at a STA. The sounding element measurements may be directed to uplink (UL) or downlink (DL) communications. The sounding element measurements may be confined to a particular multi-user wireless technique, such as MIMO (e.g., spatial streams or beamforming measurements) or OFDMA (e.g., subchannel measurements).

The report type may include several aspects. In a first aspect, the report type may indicate a feedback type. The feedback type may include one or more compressed measurements. Example compressed measurements may include, for example, average SNR—computed by adding sounding element SNRs and dividing by the number of sounding elements, only changes in a measurement between phases—e.g., if a measurement for a sub-channel SNR has not changed between the first sounding request and the second sounding request, the value will not be included in the report, or the delta SNR —computed by subtracting a current sounding element SNR with its value at the last report.

A second aspect, may indicate that the feedback type is a full (e.g., comprehensive) in which all of the previously not compressed measurements are requested, or partial, in which only a portion of those measurements are requested. In an example, a partial report is a proper subset of the measurements available in the full report.

In a third aspect, the report type may indicate a feedback report type. The feedback report type differs from the feedback type by specifying the format of the report sent by the STAs 110. The feedback report types may specify which STAs are to perform measurements on specific sounding elements (e.g., spatial stream, sub-channels, etc.), how many sounding elements are to be measured, a code book selection, and how to resolve sounding element reports. A forth aspect is the application of the full or partial report applied to the third aspect. In general, the full or partial aspect of a sounding request functions to allow the AP 105 to query STAs 110 for only the needed information.

Report type aspects, or other elements of the report type included in a sounding request may be pre-negotiated between the AP 105 and STAs 110 at, for example, association with the AP 105. In this example, the AP 105 may communicate which of several pre-negotiated report type parameters are to be used by a STA 110 in a wireless communication frame (e.g., TFS, NDP-A, etc.). In an example, the report type aspects may be communicated in a frame during wireless communication. In an example, a hybrid of pre-negotiated report type parameters and ad-hoc frame parameters may be used.

The STA 110 may include a sounding analyzer 145 and a transmission controller 150. In an example, the sounding analyzer 145 and the transmission controller 150 are implemented as a component of the STA 110. In every case, the sounding analyzer 145 and the transmission controller 150 are implemented in computer hardware, such as a circuit set described below with respect to FIG. 5. Also, as with the transmission controller 120 of the AP 105, the transmission controller 150 of the STA 110 may directly or indirectly transmit wireless messages.

The transmission controller 150 may be arranged to receive an initial request for an initial sounding report. The initial request pertains to sounding elements measureable at the STA 110.

The transmission controller 150 may be arranged to receive a subsequent request for a subsequent sound report (e.g., again from the AP 105).

The transmission controller 150 may be arranged to transmit a report of the sounding measurements in response to the subsequent request. The transmission controller 150 have may transmitted a report in response to the initial request as well, however, it operation with respect to the sparse reporting is exemplified in responding to the subsequent request. As noted above, either the initial request or the subsequent request may include report type indications with which the STA 110 will comply.

The sounding analyzer 145 may be arranged to perform measurements on sounding elements specified in either the initial sounding request of the subsequent sounding request. The sounding analyzer 145 may be arranged to produce a report respective to the initial sounding request of the subsequent sounding request. Thus, the sounding analyzer 145 performs the measurements, compiles the report, and provides the report to the transmission controller 150 to transmit to the AP 105.

Figure 2:
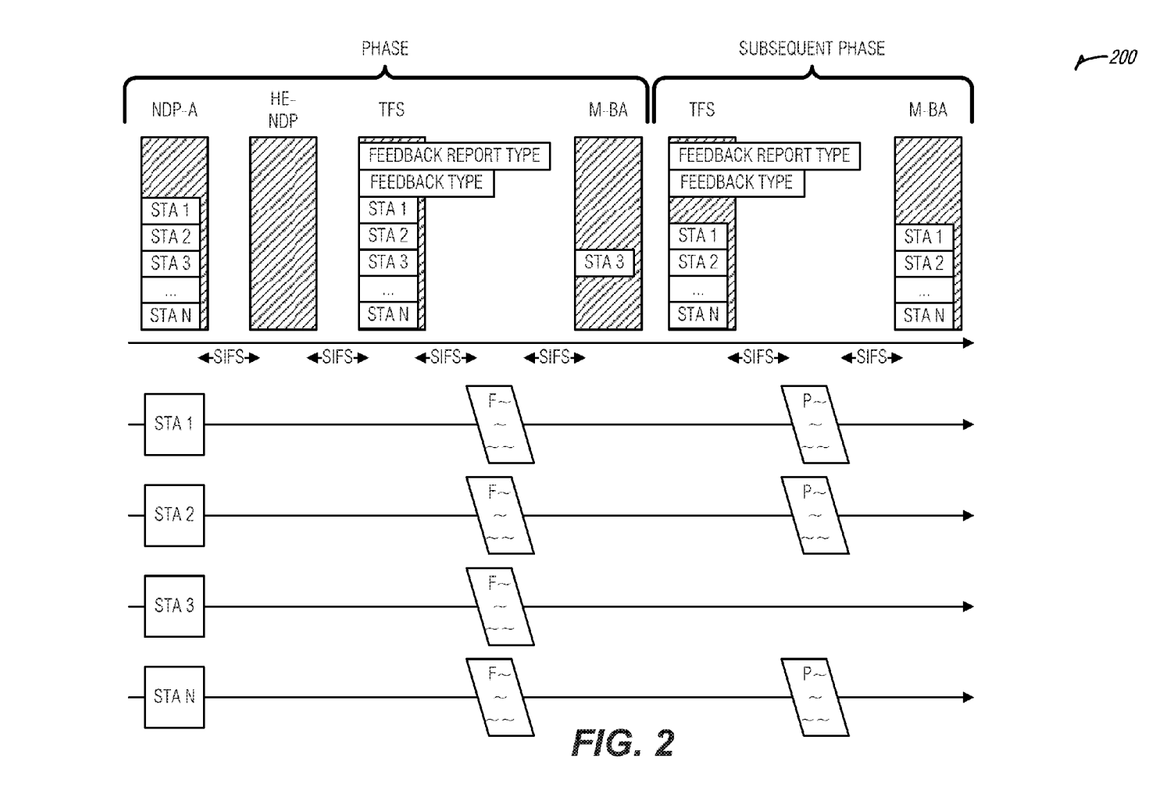
FIG. 2 illustrates a message-flow diagram of an example exchange implementing multi-phase wireless sounding, according to some embodiments.

FIG. 2 illustrates a message-flow diagram of an example exchange 200 implementing multi-phase wireless sounding, according to some embodiments. As illustrated, the horizontal arrows indicate timelines moving from left to right. The uppermost timeline is that of the requester (e.g., AP). The lower timelines refer to exchanges for the respective receivers (e.g., STAs 1–N). The spacing, in time, between the messages is the short interframe space (SIFS), defined by the IEEE 802.11 standard.

The shaded boxes represent frames. As illustrated, in the first phase, the AP optionally makes a first sounding request of the STAs 1–N in the NDP-A frame. Alternatively, the request may be made in the TES. As illustrated in the first phase TFS request, the request includes a report type indication in the form of a feedback report type and a feedback type (as discussed above).

After receiving the sound request, the STAs respond, in this case with a full report (denoted by the "F"). After the reporting period, the AP transmits the M-BA, which in this case is empty. The AP then begins the subsequent phase with another TFS, but this time omits STA 3 from reporting. The identified STAs respond with a partial report, as indicated in the feedback report type or feedback type transmitted in the subsequent phase TFS. STA 3 does not transmit a report because it was not identified by the AP in the TFS. After receiving the partials reports, the AP transmits a M-BA indicated receipt of the reports from the subsequent phase. After receiving the M-BA indicating that their respective reports were received, the STAs do not need to report again and may, for example, enter a low power state to conserve energy.

As discussed above, the illustrated exchange demonstrates a phased method of wireless element sounding, where in the first phase the requester (e.g., AP, or other beam former) requests (sparse or full) compressed sounding reports (e.g., beamforming or CSI reports) from a first set of receivers (e.g., STAs or other beamformees). In the second phase, based on the sounding reports from received from members of the first set of STAs, the AP selects a second set of STAs from the first set of STAs in the first phase. As illustrated, the requests may include identification of STAs, feedback report type, and feedback type.

In the first phase, a variety of criteria may be used by the AP to select which of the STAs participate in the initial wireless element sounding, including any one or more of:
  STA capability
  STA transmission characteristics (e.g., measured from previous transmissions)
  Expected allocated spatial streams or resource units
  Expected total or allocated transmit power
  Expected beamforming format of specific STAs or group of STAs In selecting the second set of STAs, the AP may use any one or more of the following criteria:
  STAs beamforming report SCSI KPIs acquired from previous phases.
  AP quality of service (QoS) KPIs (e.g., QoS category, queue length, priority, activity, etc.)
  STA operation mode (power save, etc.)
  STA long term link level KPIs (e.g., power, SNR, ESNR, SINR, link budget, noise floor, number of STAs receive antennas, channel status information feedback, goodput, channel occupancy, etc.)
  STA-AP mutual interference level KPIs (e.g., power, SNR, ESNR, SINR, link budget, number of STA receive antennas, CSI, computing a preceding matrix, etc.)

In an example, for the multi-phased wireless element sounding for MU-MIMO, the first phase proceeds as described above, but the second phase may be initiated by the AP with an NDP-A frame, followed by HE-NDP, TFS, uplink (UL) compressed reports, and finally the M-BA. This mechanism may be beneficial when the channel is quickly changing and the HE-NDP in the first phase may lose its usefulness for the second phase.

In an example, a mixed multi-phase wireless element sounding may be used. In this technique, the AP requests feedback in the second phase from STAs by indicating a specific follow up feedback report type and feedback type as well as re-requesting previous feedback from STAs that were not received correctly in the first phase. Accordingly, the second phase may be used for sparse reporting from the second subset of STAs and also allows re-transmissions from STAs in first phase.

In an example, the specific frames used for AP requests may include multiple phases of wireless element sounding with sequence 1) a NDP-A frame and an HE-NDP frame and followed by subsequent phases of TFS, UL reports, and M-BA or 2) multiple phases of NDP-A, HE-NDP, TES, UL reports, and NI-BA.

Figure 3:
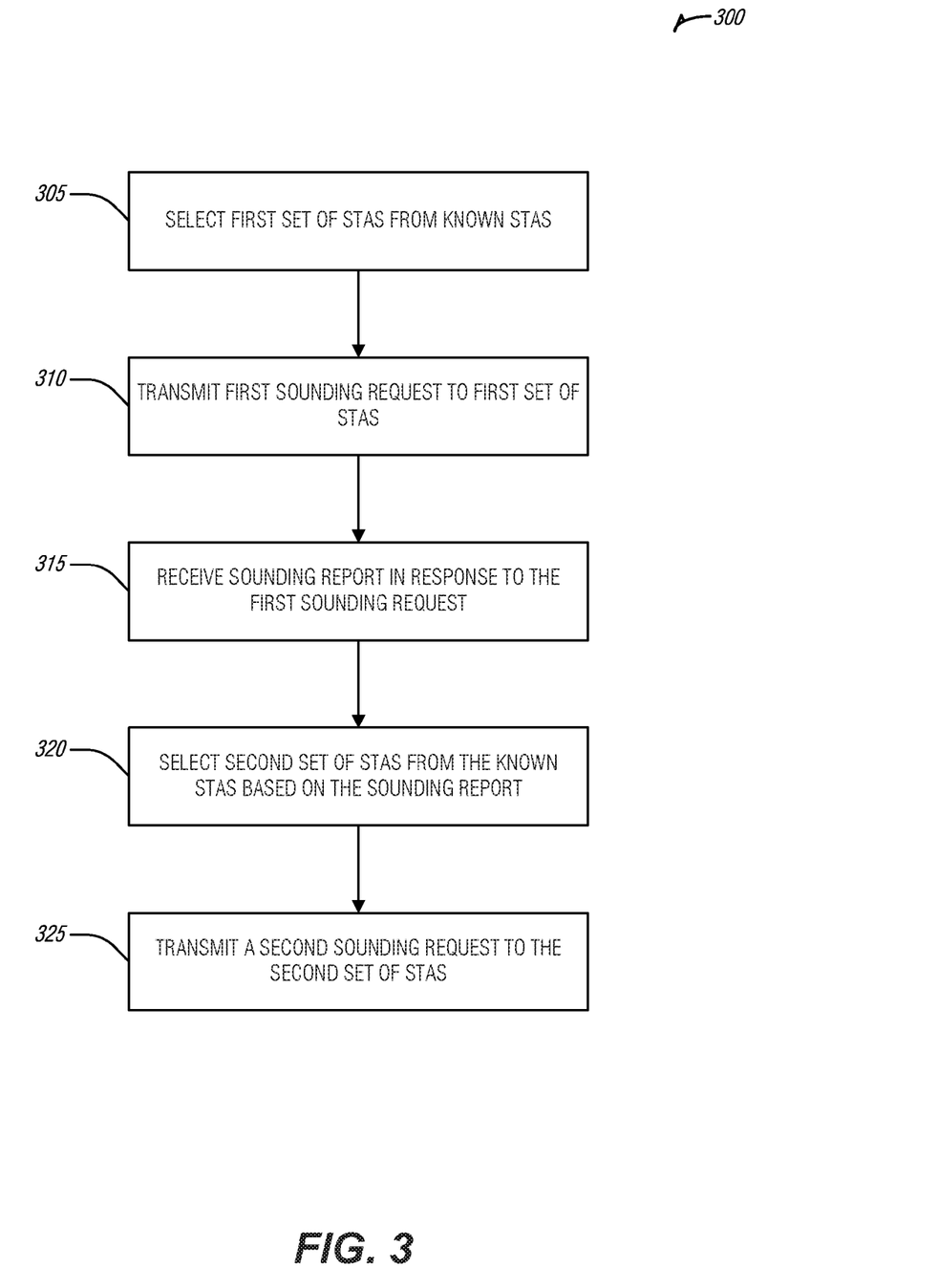
FIG. 3 is a flowchart of an example of a method for a requester implementing multi-phase wireless sounding, according to some embodiments.

FIG. 3 is a flowchart of an example of a method 300 for a requester implementing multi-phase wireless sounding, according to some embodiments. The operations of the requester are implemented in computer hardware, such as the components discussed above with respect to FIG. 1 relating to an AP, or circuit sets as discussed below with respect to FIG. 5. Accordingly, the operations of the method 300 are machine-implemented.

At operation 305, a first set STAs may be selected from a plurality of STAs known to the AP. In an example, selecting the first set of STAs may include classifying the plurality of STAs by at least one of STA capability, previously measured communication characteristic, expected allocation of sounding elements, expected transmit power metric, or expected beamforming format within a group of STAs. The STAs may then be selected from the plurality of STAs that meet classification criteria for a current sounding.

At operation 310, a first sounding request may be transmitted to members of the first set of stations. In an example, the first sounding request may include an indication of a report type pertaining to sounding element measurements. As noted above, report type may include one or both of a feedback type or a feedback report type. In an example, the indication references a report type from a set of report types previously negotiated between the AP and the first set of STAs. In an example, the indication includes elements of which the report type comprises. In an example, the elements of which the report type comprises includes at least one of a number of sounding elements, correlation between STAs and sounding elements, code book selection, or resolution of element reports. In an example, the first sounding request is transmitted in a NDP-A frame. In an example, the first sounding request is transmitted in a HE-NDP frame. In an example the first sounding request is transmitted in a TFS.

In an example, the report type is a beamforming report requesting measurements on a set of spatial streams. In this example, the sounding element measurements are of spatial streams. In an example, the report type is an OFDMA report where the sounding element measurements are of sub-channel resource units.

In an example, the report type is a partial report including a proper subset of available sounding element measurements. In an example, the available sounding element measurements include at least some compressed metrics. In an example, the compressed metrics include SNR computed by averaging SNR measurements of sounding elements measured at a STA. In an example, the compressed metrics include delta SNR computed by measuring a change in SNR for a sounding element measured at a STA. In an example, the sounding element measurements consist of a single compressed metric.

At operation 315, a sounding report may be received in response to the first sounding request from a non-empty subset of the first set of STAs. In an example, receiving the sounding report includes transmitting a Ni-BA indicating receipt of data from members of the first set of STAs received for the sounding report.

At operation 320, a second set of STAs may be selected from the plurality of STAs based on the sounding report, where the second set of STAs are a proper subset of the first set of STAs. In an example, selecting the second set of STAs based on the sounding report includes selecting STAs from the first set of STAs that are not represented in the sounding report. in an example, the selecting of the second set of STAs may include classifying STAs represented in the sounding report with KPIs, which may include one or more of including AP quality of service, STA operation mode, STA long term link level, or STA-AP mutual interference level. The AP may then select classified STAs when one or more KPIs fall below respective thresholds.

At operation 325, a second sounding request may be transmitted to the second set of STAs. In an example, the second sounding request is transmitted in a NDP-A frame. In an example, the second sounding request is transmitted in a HE-NDP frame. In an example, second sounding request is transmitted in a TFS.

Figure 4:
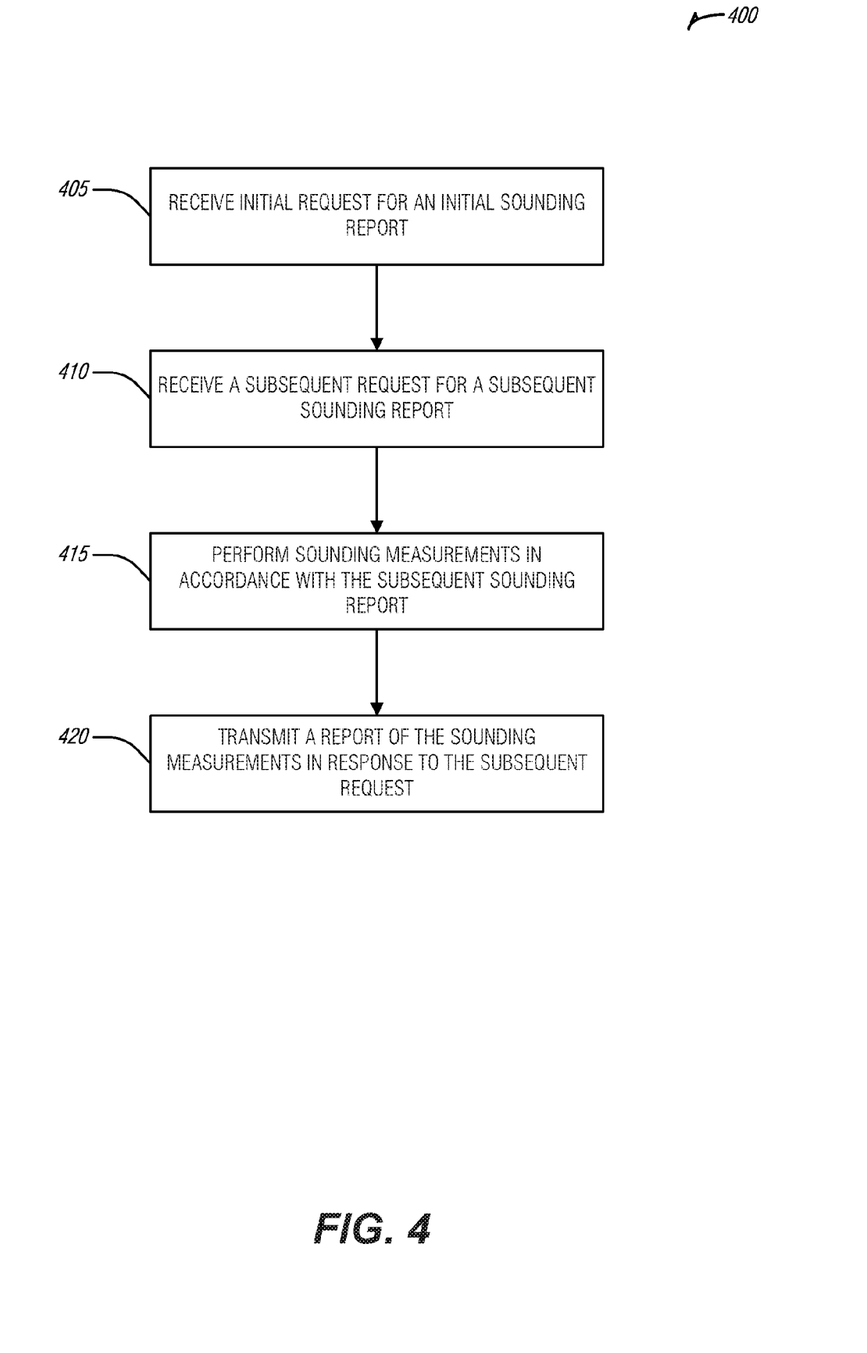
FIG. 4 is a flowchart of an example of a method for a receiver implementing multi-phase wireless sounding, according to some embodiments.

FIG. 4 is a flowchart of an example of a method for a receiver implementing multi-phase wireless sounding, according to some embodiments. The operations of the receiver are implemented in computer hardware, such as the components discussed above with respect to FIG. 1 relating to a STA, or circuit sets as discussed below with respect to FIG. 5. Accordingly, the operations of the method 400 are machine-implemented.

At operation 405, an initial request for an initial sounding report on sounding elements measureable at the STA may be received. In an example, the initial request includes a report type. In an example, the report type is a comprehensive report type, the comprehensive report type including all available sounding element measurements. In an example, the initial request specifies one or more of the number of sounding elements to be measured, which sounding elements a given STA will measure, resolution of element reports, or code book selection.

At operation 410, a subsequent request for a subsequent sounding report may be received. In an example, the subsequent request indicates a report type. In an example, the report type is a sparse report type where the sparse report type including a proper subset of available sounding element measurements. In an example, the initial request specifies one or more of the number of sounding elements to be measured, which sounding elements a given STA will measure, resolution of element reports, or code book selection. In an example, the report type indicated in the subsequent request is related to the report type indicated in the initial request.

At operation 415, measurements in accordance to the subsequent sounding request may be performed. These measurements provide the data to populate this STAs portion of the sounding report.

At operation 420, a report of the sounding measurements may be transmitted in response to the subsequent request. In an example, the STA may further receive an M-BA in response to sending the subsequent sounding report. In an example, the STA may further entering a low-power state in the STA following receipt of the M-BA.

Figure 5:
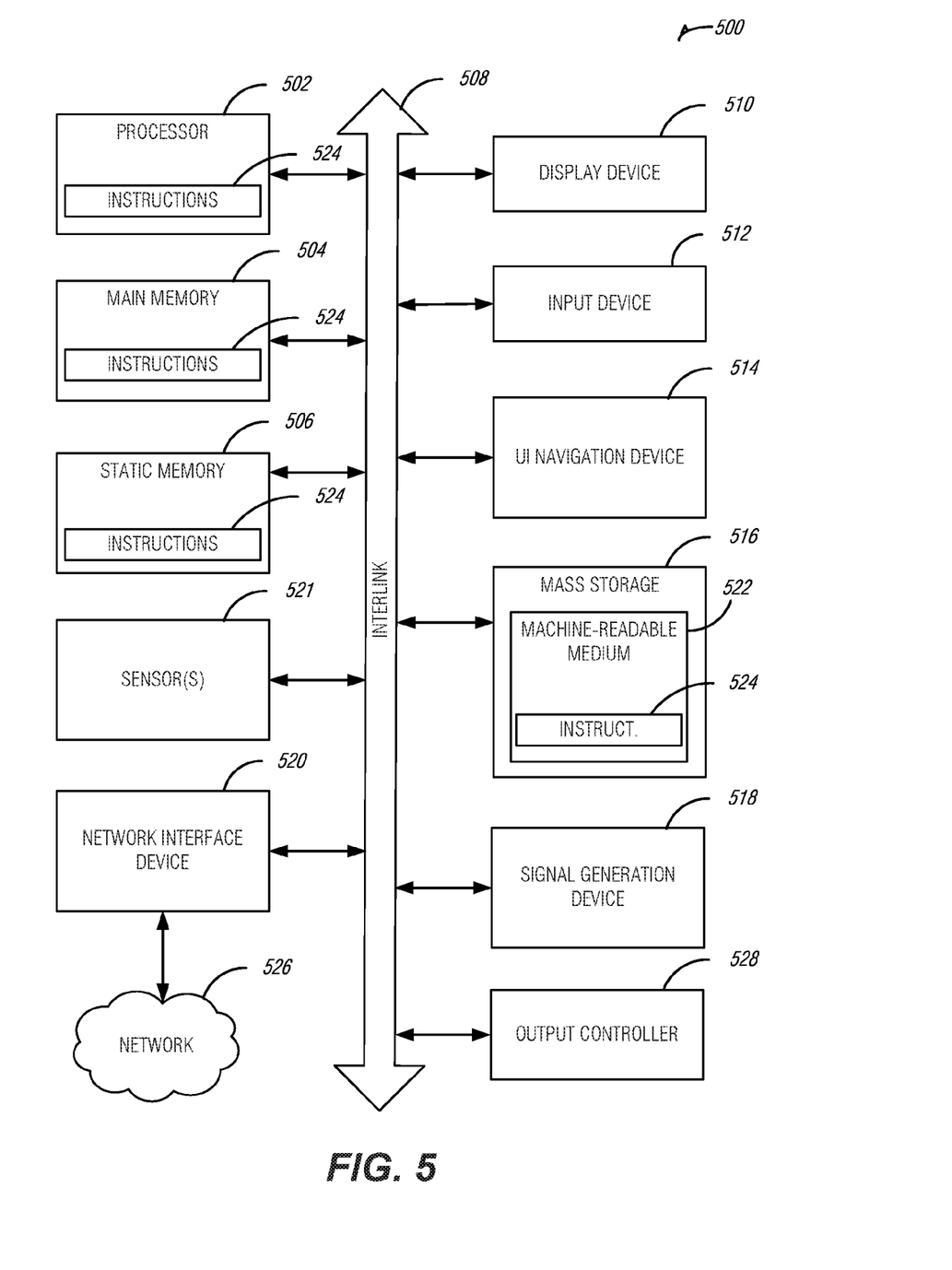
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or, jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions direct embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may be in any suitable form, such as but not limited to source code, compiled code, interpreted code, executable code, static code, dynamic code, etc. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

Various embodiments discussed herein may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes & Examples

Example 1 is an apparatus of an access point for multi-phase wireless sounding, the apparatus comprising: a discriminator to: select a first set of stations (STAs) from a plurality of STAs known to the AP; and select a second set of STAs from the plurality of STAs based on a sounding report, the second set of STAs being a proper subset of the first set of STAs; and a transmission controller to: transmit a first sounding request to members of the first set of stations; receive the sounding report in response to the first sounding request from a non-empty subset of the first set of STAs; and transmit a second sounding request to the second set of STAs.

In Example 2, the subject matter of Example 1 optionally includes, wherein the first sounding request includes an indication of a report type pertaining to sounding element measurements.

In Example 3, the subject matter of Example 2 optionally includes, wherein the indication references a report type from a set of report types previously negotiated between the AP and the first set of STAs.

In Example 4, the subject matter of any one or more of Examples 2-3 optionally include, wherein the indication includes elements of which the report type comprises.

In Example 5, the subject matter of Example 4 optionally includes.2, wherein the elements of which the report type comprises includes at least one of a number of sounding elements, correlation between STAs and sounding elements, code book selection, or resolution of element reports.

In Example 6, the subject matter of any one or more of Examples 2-5 optionally include, wherein the report type is a beamforming report requesting measurements on a set of spatial streams, and wherein the sounding element measurements are of spatial streams.

In Example 7, the subject matter of any one or more of Examples 2-6 optionally include, wherein the report type is an orthogonal frequency-division multiple access (OFDMA) report, and wherein the sounding element measurements are of sub-channel resource units.

In Example 8, the subject matter of any one or more of Examples 2-7 optionally include, wherein the report type is a partial report, the partial report including a proper subset of available sounding element measurements.

In Example 9, the subject matter of Example 8 optionally includes.1, wherein the available sounding element measurements include at least some compressed metrics.

In Example 10, the subject matter of Example 9 optionally incudes.2, wherein the compressed metrics include average signal-to-noise-ratio (SNR) computed by averaging SNR measurements of sounding elements measured at a STA.

In Example 11, the subject matter of any one or more of Examples 9-10 optionally include.2, wherein the compressed metrics include delta. SNR computed by measuring a change in SNR for a sounding element measured at a STA.

In Example 12, the subject matter of any one or more of Examples 9-11 optionally include.2, wherein the sounding element measurements consist of a single compressed metric.

In Example 13, the subject matter of any one or more of Examples 1-12. optionally include, wherein to select the first set of STAs includes the discriminator to: classify the plurality of STAs by at least one of STA capability, previously measured communication characteristic, expected allocation of sounding elements, expected transmit power metric, or expected beamforming format within a group of STAs; and select STAB from the plurality of STAs that meet classification criteria for a current sounding.

In Example 14, the subject matter of any one or more of Examples 1-13 optionally include, wherein to select the second set of STAs based on the sounding report includes the discriminator to select STAs from the first set of STAs that are not represented in the sounding report.

In Example 15, the subject matter of any one or more of Examples 1-14 optionally include, wherein to select the second set of STAs based on the sounding report includes the discriminator to: classify STAs represented in the sounding report with key performance indices, the key performance indices including AP quality of service, STA operation mode, STA long term link level, or STA-AP mutual interference level; and select classified STAs when one or more key performance indices fall below respective thresholds.

In Example 16, the subject matter of any one or more of Examples 1-15 optionally include, wherein to receive the sounding report includes the transmission controller to receive a multi-user block acknowledgement (M-BA) indicating receipt of the sounding report.

In Example 17, the subject matter of any one or more of Examples 1-16 optionally include, wherein the first sounding request or the second sounding request is transmitted in a null data packet announcement (NDP-A) frame.

In Example 18, the subject matter of any one or more of Examples 1-17 optionally include, wherein the first sounding request or the second sounding request is transmitted in a high efficiency (HE) null data packet (NDP) frame.

In Example 19, the subject matter of any one or more of Examples 1-18 optionally include, wherein the first sounding request or the second sounding request is transmitted in a trigger frame for sounding (TTS).

Example 20 is an apparatus of an access point for multi-phase wireless sounding, the apparatus comprising: means for selecting, by an access point (AP), a first set of stations (STAs) from a plurality of STAs known to the AP; means for transmitting a first sounding request to members of the first set of stations; means for receiving a sounding report in response to the first sounding request from a non-empty subset of the first set of STAs; means for selecting a second set of STAs from the plurality of STAs based on the sounding report, the second set of STAs being a proper subset of the first set of STAs; and means for transmitting a second sounding request to the second set of STAs.

In Example 21, the subject matter of Example 20 optionally includes, wherein the first sounding request includes an indication of a report type pertaining to sounding element measurements.

In Example 22, the subject matter of Example 21 optionally includes, wherein the indication references a report type from a set of report types previously negotiated between the AP and the first set of STAs.

In Example 23, the subject matter of any one or more of Examples 21-22 optionally include, wherein the indication includes elements of which the report type comprises.

In Example 24, the subject matter of Example 23 optionally includes.2, wherein the elements of which the report type comprises includes at least one of a number of sounding elements, correlation between STAs and sounding elements, code book selection, or resolution of element reports.

In Example 25, the subject matter of any one or more of Examples 21-24 optionally include, wherein the report type is a beamforming report requesting measurements on a set of spatial streams, and wherein the sounding element measurements are of spatial streams.

In Example 26, the subject matter of any one or more of Examples 21-25 optionally include, wherein the report type is an orthogonal frequency-division multiple access (OFDMA) report, and wherein the sounding element measurements are of sub-channel resource units.

In Example 27, the subject matter of any one or more of Examples 21-26 optionally include, wherein the report type is a partial report, the partial report including a proper subset of available sounding element measurements.

In Example 28, the subject matter of Example 27 optionally includes.1, wherein the available sounding element measurements include at least some compressed metrics.

In Example 29, the subject matter of Example 28 optionally includes.2, wherein the compressed metrics include average signal-to-noise-ratio (SNR) computed by averaging SNR measurements of sounding elements measured at a STA.

In Example 30, the subject matter of any one or more of Examples 28-29 optionally include.2, wherein the compressed metrics include delta SNR computed by measuring a change in SNR for a sounding element measured at a STA.

In Example 31, the subject matter of any one or more of Examples 28-30 optionally include.2, wherein the sounding element measurements consist of a single compressed metric.

In Example 32, the subject matter of any one or more of Examples 20-31 optionally include, wherein selecting the first set of STAs includes: classifying the plurality of STAs by at least one of STA capability, previously measured communication characteristic, expected allocation of sounding elements, expected transmit power metric, or expected beamforming format within a group of STAs; and selecting STAs froth the plurality of STAs that meet classification criteria for a current sounding.

In Example 33, the subject matter of any one or more of Examples 20-32 optionally include, wherein selecting the second set of STAs based on the sounding report includes selecting STAs from the first set of STAs that are not represented in the sounding report.

In Example 34, the subject matter of any one or more of Examples 20-33 optionally include, wherein selecting the second set of STAs based on the sounding report includes: means for classifying STAs represented in the sounding report with key performance indices, the key performance indices including AP quality of service, STA operation mode, STA long term link level, or STA-AP mutual interference level; and means for selecting classified STAs when one or more key performance indices fall below respective thresholds.

In Example 35, the subject matter of any one or more of Examples 20-34 optionally include, wherein receiving the sounding report includes transmitting a multi-user block acknowledgement (M-BA) indicating receipt of the sounding report.

In Example 36, the subject matter of any one or more of Examples 20-35 optionally include, wherein the first sounding request or the second sounding request is transmitted in a null data packet announcement (NDP-A) frame.

In Example 37, the subject matter of any one or more of Examples 20-36 optionally include, wherein the first sounding request or the second sounding request is transmitted in a high efficiency (HE) null data packet (NDP) frame.

In Example 38, the subject matter of any one or more of Examples 20-37 optionally include, wherein the first sounding request or the second sounding request is transmitted in a trigger frame for sounding (ITS).

Example 39 is at least one machine readable medium including instructions for multi-phase wireless sounding, the instructions, when executed by an access point (AP), cause the AP to: select a first set of stations (STAs) from a plurality of STAs known to the AP; transmit a first sounding request to members of the first set of stations; receive a sounding report in response to the first sounding request from a non-empty subset of the first set of STAs; select a second set of STAs from the plurality of STAs based on the sounding report, the second set of STAs being a proper subset of the first set of STAs; and transmit a second sounding request to the second set of STAs.

In Example 40, the subject matter of Example 39 optionally includes, wherein the first sounding request includes an indication of a report type pertaining to sounding element measurements.

In Example 41, the subject matter of Example 40 optionally includes, wherein the indication references a report type from a set of report types previously negotiated between the AP and the first set of STAs.

In Example 42, the subject matter of any one or more of Examples 40-41 optionally include, wherein the indication includes elements of which the report type comprises.

In Example 43, the subject matter of Example 42 optionally includes.2, wherein the elements of which the report type comprises includes at least one of a number of sounding elements, correlation between STAs and sounding elements, code book selection, or resolution of element reports.

In Example 44, the subject matter of any one or more of Examples 40-43 optionally include, wherein the report type is a beamforming report requesting measurements on a set of spatial streams, and wherein the sounding element measurements are of spatial streams.

In Example 45, the subject matter of any one or more of Examples 40-44 optionally include, wherein the report type is an orthogonal frequency-division multiple access (OFDMA) report, and wherein the sounding element measurements are of sub-channel resource units.

In Example 46, the subject matter of any one or more of Examples 40-45 optionally include, wherein the report type is a partial report, the partial report including a proper subset of available sounding element measurements.

In Example 47, the subject matter of Example 46 optionally includes.1, wherein the available sounding element measurements include at least some compressed metrics.

In Example 48, the subject matter of Example 47 optionally inciudes.2, wherein the compressed metrics include average signal-to-noise-ratio (SNR) computed by averaging SNR measurements of sounding elements measured at a STA.

In Example 49, the subject matter of any one or more of Examples 47-48 optionally include.2, wherein the compressed metrics include delta SNR computed by measuring a change in SNR for a sounding element measured at a STA.

In Example 50, the subject matter of any one or more of Examples 47-49 optionally include.2, wherein the sounding element measurements consist of a single compressed metric.

In Example 51, the subject matter of any one or more of Examples 39-50 optionally include, wherein to select the first set of STAs includes the AP to: classify the plurality of STAs by at least one of STA capability, previously measured communication characteristic, expected allocation of sounding elements, expected transmit power metric, or expected beamforming format within a group of STAs; and select STAs from the plurality of STAs that meet classification criteria for a current sounding.

In Example 52, the subject matter of any one or more of Examples 39-51 optionally include, wherein to select the second set of STAs based on the sounding report includes the AP to select STAs from the first set of STAs that are not represented in the sounding report.

In Example 53, the subject matter of any one or more of Examples 39-52 optionally include, wherein to select the second set of STAs based on the sounding report includes the AP to: classify STAs represented in the sounding report with key performance indices, the key performance indices including AP quality of service, STA operation mode, STA long term link level, or STA-AP mutual interference level;

and select classified STAs when one or more key performance indices fall below respective thresholds.

In Example 54, the subject matter of any one or more of Examples 39-53 optionally include, wherein to receive the sounding report includes the AP to receive a multi-user block acknowledgement (M-BA) indicating receipt of the sounding report.

In Example 55, the subject matter of any one or more of Examples 39-54 optionally include, wherein the first sounding request or the second sounding request is transmitted in a null data packet announcement (NDP-A) frame.

In Example 56, the subject matter of any one or more of Examples 39-55 optionally include, wherein the first sounding request or the second sounding request is transmitted in a high efficiency (HE) null data packet (NDP) frame.

In Example 57, the subject matter of any one or more of Examples 39-56 optionally include, wherein the first sounding request or the second sounding request is transmitted in a trigger frame for sounding (TTS).

Example 58 is a method for multi-phase wireless sounding, the method comprising: selecting, by an access point (AP), a first set of stations (STAs) from a plurality of STAs known to the AP; transmitting a first sounding request to members of the first set of stations; receiving a sounding report in response to the first sounding request from a non-empty subset of the first set of STAs; selecting a second set of STAs from the plurality of STAs based on the sounding report, the second set of STAs being a proper subset of the first set of STAs; and transmitting a second sounding request to the second set of STAs.

In Example 59, the subject matter of Example 58 optionally includes, wherein the first sounding request includes an indication of a report type pertaining to sounding element measurements.

In Example 60, the subject matter of Example 59 optionally includes, wherein the indication references a report type from a set of report types previously negotiated between the AP and the first set of STAs.

In Example 61, the subject matter of any one or more of Examples 59-60 optionally include, wherein the indication includes elements of which the report type comprises.

In Example 62, the subject matter of Example 61 optionally includes.2, wherein the elements of which the report type comprises includes at least one of a number of sounding elements, correlation between STAs and sounding elements, code book selection, or resolution of element reports.

In Example 63, the subject matter of any one or more of Examples 59-62 optionally include, wherein the report type is a beamforming report requesting measurements on a set of spatial streams, and wherein the sounding element measurements are of spatial streams.

In Example 64, the subject matter of any one or more of Examples 59-63 optionally include, wherein the report type is an orthogonal frequency-division multiple access (OFDMA) report, and wherein the sounding element measurements are of sub-channel resource units.

In Example 65, the subject matter of any one or more of Examples 59-64 optionally include, wherein the report type is a partial report, the partial report including a proper subset of available sounding element measurements.

In Example 66, the subject matter of Example 65 optionally includes.1, wherein the available sounding element measurements include at least some compressed metrics.

In Example 67, the subject matter of Example 66 optionally includes.2, wherein the compressed metrics include average signal-to-noise-ratio (SNR) computed by averaging SNR measurements of sounding elements measured at a STA.

In Example 68, the subject matter of any one or more of Examples 66-67 optionally include.2, wherein the compressed metrics include delta SNR computed by measuring a change in SNR for a sounding element measured at a STA.

In Example 69, the subject matter of any one or more of Examples 66-68 optionally include.2, wherein the sounding element measurements consist of a single compressed metric.

In Example 70, the subject matter of any one or more of Examples 58-69 optionally include, wherein selecting the first set of STAs includes: classifying the plurality of STAs by at least one of STA capability, previously measured communication characteristic, expected allocation of sounding elements, expected transmit power metric, or expected beamforming format within a group of STAs; and selecting STAs from the plurality of STAs that meet classification criteria for a current sounding.

In Example 71, the subject matter of any one or more of Examples 58-70 optionally include, wherein selecting the second set of STAs based on the sounding report includes selecting STAs from the first set of STAs that are not represented in the sounding report.

In Example 72, the subject matter of any one or more of Examples 58-71 optionally include, wherein selecting the second set of STAs based on the sounding report includes: classifying STAs represented in the sounding report with key performance indices, the key performance indices including AP quality of service, STA operation mode, STA long term link level, or STA-AP mutual interference level; and selecting classified STAs when one or more key performance indices fall below respective thresholds.

In Example 73, the subject matter of any one or more of Examples 58-72 optionally include, wherein receiving the sounding report includes transmitting a multi-user block acknowledgement (M-BA) indicating receipt of the sounding report.

In Example 74, the subject matter of any one or more of Examples 58-73 optionally include, wherein the first sounding request or the second sounding request is transmitted in a null data packet announcement (NDP-A) frame.

In Example 75, the subject matter of any one or more of Examples 58-74 optionally include, wherein the first sounding request or the second sounding request is transmitted in a high efficiency (HE) null data packet (NDP) frame.

In Example 76, the subject matter of any one or more of Examples 58-75 optionally include, wherein the first sounding request or the second sounding request is transmitted in a trigger frame for sounding (TFS).

Example 77 is a apparatus of a station (STA) for multi-phase wireless sounding, the apparatus comprising: a transmission controller to: receive an initial request for an initial sounding report on sounding elements measureable at the STA; receive a subsequent request for a subsequent sounding report; and transmit a report of the sounding measurements in response to the subsequent request; and a sounding analyzer to: perform measurements on sounding elements specified in either the initial sounding request or the subsequent sounding request; and produce a report respective to the initial sounding request or the subsequent sounding request.

In Example 78, the subject matter of Example 77 optionally includes, wherein the initial request indicates a report type.

In Example 79, the subject matter of Example 78 optionally includes, wherein the report type is a sparse report type, the sparse report type including a proper subset of available sounding element measurements.

In Example 80, the subject matter of any one or more of Examples 78-79 optionally include, wherein the report type is a comprehensive report type, the comprehensive report type including all available sounding element measurements.

In Example 81, the subject matter of any one or more of Examples 78-80 optionally include, wherein the initial request specifies one or more of the number of sounding elements to be measured, which sounding elements a given STA will measure, resolution of element reports, or code book selection.

In Example 82, the subject matter of any one or more of Examples 77-81 optionally include, wherein the transmission controller is to receive a multi-user block acknowledgment (M-BA) in response to sending the subsequent sounding report.

In Example 83, the subject matter of Example 82 optionally includes, wherein the transmission controller is to invoke a low-power state in the STA following receipt of the M-BA.

Example 84 is an apparatus implemented by a station (STA) for multi-phase wireless sounding, the apparatus comprising: means for receiving an initial request for an initial sounding report on sounding elements measureable at the STA; means for receiving a subsequent request for a subsequent sounding report; means for performing measurements in accordance to the subsequent sounding request; and means for transmitting a report of the sounding measurements in response to the subsequent request.

In Example 85, the subject matter of Example 84 optionally includes, wherein the initial request indicates a report type.

In Example 86, the subject matter of Example 85 optionally includes, wherein the report type is a sparse report type, the sparse report type including a proper subset of available sounding element measurements.

In Example 87, the subject matter of any one or more of Examples 85-86 optionally include, wherein the report type is a comprehensive report type, the comprehensive report type including all available sounding element measurements.

In Example 88, the subject matter of any one or more of Examples 85-87 optionally include, wherein the initial request specifies one or more of the number of sounding elements to be measured, which sounding elements a given STA will measure, resolution of element reports, or code book selection.

In Example 89, the subject matter of any one or more of Examples 84-88 optionally include means for receiving a multi-user block acknowledgment (M-BA) in response to sending the subsequent sounding report.

In Example 90, the subject matter of Example 89 optionally includes means for entering a low-power state in the STA following receipt of the M-BA.

Example 91 is at least on machine readable medium including instructions for multi-phase wireless sounding, the instructions, when executed by a station (STA), cause the STA to: receive an initial request for an initial sounding report on sounding elements measureable at the STA; receive a subsequent request for a subsequent sounding report; perform measurements in accordance to the subsequent sounding request; and transmit a report of the sounding measurements in response to the subsequent request.

In Example 92, the subject matter of Example 91 optionally includes, wherein the initial request indicates a report type.

In Example 93, the subject matter of Example 92 optionally includes, wherein the report type is a sparse report type, the sparse report type including a proper subset of available sounding element measurements.

In Example 94, the subject matter of any one or more of Examples 92-93 optionally include, wherein the report type is a comprehensive report type, the comprehensive report type including all available sounding element measurements.

In Example 95, the subject matter of any one or more of Examples 92-94 optionally include, wherein the initial request specifies one or more of the number of sounding elements to be measured, which sounding elements a given STA will measure, resolution of element reports, or code book selection.

In Example 96, the subject matter of any one or more of Examples 91-95 optionally include, wherein the STA is to receive a multi-user block acknowledgment (M-B A) in response to sending the subsequent sounding report.

In Example 97, the subject matter of Example 96 optionally includes, wherein the STA is to enter a low-power state in the STA following receipt of the M-BA.

Example 98 is a method implemented by a station (STA) for multi-phase wireless sounding, the method comprising: receiving an initial request for an initial sounding report on sounding elements measureable at the STA; receiving a subsequent request for a subsequent sounding report; performing measurements in accordance to the subsequent sounding request; and transmitting a report of the sounding measurements in response to the subsequent request.

In Example 99, the subject matter of Example 98 optionally includes, wherein the initial request indicates a report type.

In Example 100, the subject matter of Example 99 optionally includes, wherein the report type is a sparse report type, the sparse report type including a proper subset of available sounding element measurements.

In Example 101, the subject matter of any one or more of Examples 99-100 optionally include, wherein the report type is a comprehensive report type, the comprehensive report type including all available sounding element measurements.

In Example 102, the subject matter of any one or more of Examples 99-101 optionally include, wherein the initial request specifies one or more of the number of sounding elements to be measured, which sounding elements a given STA will measure, resolution of element reports, or code hook selection.

In Example 103, the subject matter of any one or more of Examples 98-102 optionally include receiving a multi-user block acknowledgment (M-BA) in response to sending the subsequent sounding report.

In Example 104, the subject matter of Example 103 optionally includes entering a low-power state in the STA following receipt of the M-BA.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term. in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may he used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus of a high-efficiency (HE) wireless station (STA) (HE STA), the apparatus comprising:
   processing circuitry; and memory,
   the processing circuitry to configure the HE STA to operate as an HE beamformer to implement HE sounding protocol to determine channel state information for transmit beamforming or for downlink (DL) multi-user (MU) multiple-input multiple out (MIMO) (DL MU-MIMO) operation,
   wherein to implement the HE sounding protocol, the processing circuitry is to configure the HE beamformer to:
   transmit an HE null data packet (NDP) announcement frame (HE NDPA), the HE NDPA to identify more than one HE STA;
   transmit an HE NDP a short-interframe space (SIFS) after transmission of the HE NDPA; transmit a beamforming report trigger frame for sounding an SIFS after transmission of the HE NDP, the beamforming report trigger frame to solicit HE compressed beamforming feedback from the more than one HE STA;
   receive compressed beamforming feedback reports from the more than one HE STA identified in the HE NDPA, the compressed beamforming feedback reports received in response to the beamforming report trigger frame;
   transmit a subsequent beamforming report trigger frame for sounding an SIFS after receipt of the compressed beamforming feedback reports, the subsequent beamforming report trigger frame to solicit additional compressed beamforming feedback from a subset of the more than one HE STA; and
   receive additional compressed beamforming feedback reports from HE STAs of the subset in response to the subsequent beamforming report trigger frame.

2. The apparatus of claim 1 wherein the compressed beamforming feedback reports and the additional compressed beamforming feedback reports comprise channel state information for requested resource units (RUs).

3. The apparatus of claim 2, wherein after the HE sounding protocol, the processing circuitry is to compute a matrix for the transmit beamforming or the DL MU-MIMO operation.

4. The apparatus of claim 3, wherein the processing circuitry is further configured to cause the HE beamformer to obtain a transmission opportunity (TXOP), and wherein the beamforming report trigger frame for sounding is transmitted in the TXOP, and the compressed beamforming feedback reports are received from the more than one HE STA in the TXOP.

5. The apparatus of claim 4 wherein the subsequent beamforming report trigger frame for sounding is transmitted in the TXOP, and the additional compressed beamforming feedback reports are received in the TXOP.

6. The apparatus of claim 3, wherein the processing circuitry is further configured to:
   repeat sending of subsequent beamforming report trigger frames for sounding for transmission an SIFS after a prior compressed feedback report is received, each subsequent beamforming report trigger frame to solicit further compressed beamforming feedback from another subset of the more than one HE STA.

7. The apparatus of claim 1 wherein the beamformer is an HE access point (AP), and wherein the more than one HE STA identified in the HE NDPA are HE beamformees.

8. The apparatus of claim 1 wherein the memory is configured to store the compressed beamforming feedback reports.

9. The apparatus of claim 1, further comprising transceiver circuitry configured to transmit the beamforming report trigger frame and receive the compressed beamforming feedback reports.

10. The apparatus of claim 9 further comprising a plurality of antennas coupled to the transceiver circuitry.

11. A non-transitory computer-readable storage medium that stores instructions for execution by processing circuitry of a high-efficiency (HE) wireless station (STA) (HE STA) to configure the HE STA to operate as an HE beamformer to implement an HE sounding protocol to determine channel state information for transmit beamforming or for downlink (DL) multi-user (MU) multiple-input multiple out (MIMO) (DL MU-MIMO) operation,
  wherein to implement the HE sounding protocol, the processing circuitry is to configure the HE beamformer to:
  transmit an HE null data packet (NDP) announcement frame (HE NDPA), the HE NDPA to identify more than one HE STA,
  transmit an HE NDP a short-interframe space (SIFS) after transmission of the HE NDPA;
  transmit a beamforming report trigger frame for sounding an SIFS after transmission of the HE NDP, the beamforming report trigger frame to solicit HE compressed beamforming feedback from the more than one HE STA;
  receive compressed beamforming feedback reports from the more than one HE STA identified in the HE NDPA, the compressed beamforming feedback reports received in response to the beamforming report trigger frame;
  transmit a subsequent beamforming report trigger frame for sounding an SIFS after receipt of the compressed beamforming feedback reports, the subsequent beamforming report trigger frame to solicit additional compressed beamforming feedback from a subset of the more than one HE STA; and
  receive additional compressed beamforming feedback reports from HE STAs of the subset in response to the subsequent beamforming report trigger frame.

12. The non-transitory computer-readable storage medium of claim 11 wherein the compressed beamforming feedback reports and the additional compressed beamforming feedback reports comprise channel state information for requested resource units (RUs).

13. The non-transitory computer-readable storage medium of claim 12, wherein after the HE sounding protocol, the processing circuitry is to compute a matrix for the transmit beamforming or the DL MU-MIMO operation.

14. The non-transitory computer-readable storage medium of claim 13, wherein the processing circuitry is further configured cause the HE beamformer to obtain a transmission opportunity (TXOP), and
  wherein the beamforming report trigger frame for sounding is transmitted in the TXOP, and the compressed beamforming feedback reports are received from the more than one HE STA in the TXOP.

15. The non-transitory computer-readable storage medium of claim 14 wherein the subsequent beamforming report trigger frame for sounding is transmitted in the TXOP, and the additional compressed beamforming feedback reports are received in the TXOP.

16. The non-transitory computer-readable storage medium of claim 13, wherein the processing circuitry is further configured to:
repeat sending of subsequent beamforming report trigger frames for sounding for transmission an SIFS after a prior compressed feedback report is received, each subsequent beamforming report trigger frame to solicit further compressed beamforming feedback from another subset of the more than one HE STA.

17. A method performed by an high-efficiency (HE) wireless station (STA) (HE STA) operating as an HE beamformer to implement an HE sounding protocol to determine channel state information for transmit beamforming or for downlink (DL) multi-user (MU) multiple-input multiple out (MIMO) (DL MU-MIMO) operation, the method comprises:
  transmitting, an HE null data packet (NDP) announcement frame (HE NDPA), the HE NDPA to identify more than one HE STA;
  transmitting an HE NDP a short-interframe space (SIFS) after transmission of the HE NDPA;
  transmitting a beamforming report trigger frame for sounding an SIFS after transmission of the HE NDP, the beamforming report trigger frame to solicit HE compressed beamforming feedback from the more than one HE STA;
  receiving compressed beamforming feedback reports from the more than one HE STA identified in the HE NDPA, the compressed beamforming feedback reports received in response to the beamforming report trigger frame;
  transmitting a subsequent beamforming report trigger frame for sounding an SIFS after receipt of the compressed beamforming feedback reports, the subsequent beamforming report trigger frame to solicit additional compressed beamforming feedback from a subset of the more an one HE STA; and
  receiving additional compressed beamforming feedback reports from HE STAs of the subset in response to the subsequent beamforming report trigger frame.

18. The method of claim 17 wherein the compressed beamforming feedback reports and the additional compressed beamforming feedback reports comprise channel state information for requested resource units (RUs).

19. The method of claim 18, wherein after implementing the HE sounding protocol, the method further comprise computing a matrix for the transmit beamforming or the DL MU-MIMO operation.

20. The method of claim 19, wherein the HE beamformer is configured to obtain a transmission opportunity (TXOP), and
  wherein the method further comprises:
  transmitting the beamforming report trigger frame for sounding in the TXOP; and
  receiving the compressed beamforming feedback reports from the more than one HE STA in the TXOP.

* * * * *

UNITED STATES PATENT AND TRADEMARK OFFICE
CERTIFICATE OF CORRECTION

PATENT NO. : 10,070,449 B2  
APPLICATION NO. : 15/688383  
DATED : September 4, 2018  
INVENTOR(S) : Ghosh et al.

Page 1 of 1

It is certified that error appears in the above-identified patent and that said Letters Patent is hereby corrected as shown below:

On the Title Page

On page 2, in Column 1, item (56) under "Other Publications", Line 4, delete "Acton" and insert --Action-- therefor In the Claims In Column 19, Line 60, in Claim 1, after "implement", insert --an--

In Column 21, Line 43, in Claim 14, after "configured", insert --to--

In Column 22, Line 34, in Claim 17, delete "an" and insert --than-- therefor

In Column 22, Line 44, in Claim 19, delete "comprise" and insert --comprises-- therefor Signed and Sealed this  
Eleventh Day of June, 2019

Andrei Iancu  
*Director of the United States Patent and Trademark Office*